(12) United States Patent
Onuma

(10) Patent No.: US 11,178,303 B2
(45) Date of Patent: Nov. 16, 2021

(54) DISPLAY CONTROL APPARATUS, DISPLAY CONTROL METHOD, AND SYSTEM

(71) Applicant: CANON KABUSHIKI KAISHA, Tokyo (JP)

(72) Inventor: Maki Onuma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/891,400

(22) Filed: Jun. 3, 2020

(65) Prior Publication Data

US 2020/0412898 A1   Dec. 31, 2020

(30) Foreign Application Priority Data

Jun. 28, 2019   (JP) .............................. JP2019-121681

(51) Int. Cl.
| | |
|---|---|
| *G06F 15/00* | (2006.01) |
| *G06F 3/12* | (2006.01) |
| *G06K 1/00* | (2006.01) |
| *H04N 1/00* | (2006.01) |

(52) U.S. Cl.
CPC ..... *H04N 1/00896* (2013.01); *H04N 1/00251* (2013.01); *H04N 1/00363* (2013.01); *H04N 1/00408* (2013.01)

(58) Field of Classification Search
CPC .......... H04N 1/00896; H04N 1/00251; H04N 1/00363; H04N 1/00408
USPC ............................... 358/1.1, 1.15, 1.13, 1.14
See application file for complete search history.

(56) References Cited

U.S. PATENT DOCUMENTS

| | | | |
|---|---|---|---|
| 7,668,792 B2 | 2/2010 | Hagino | |
| 7,733,394 B2 | 6/2010 | Hagino | |
| 7,889,267 B2 | 2/2011 | Hagino | |
| 7,893,987 B2 | 2/2011 | Hagino | |
| 9,697,758 B2* | 7/2017 | Watanabe | ............ G09G 3/3648 |
| 9,767,765 B2 | 9/2017 | Iwasaki et al. | |
| 10,127,893 B2 | 11/2018 | Iwasaki et al. | |
| 2002/0070278 A1 | 6/2002 | Hung et al. | |
| 2006/0146174 A1 | 7/2006 | Hagino | |
| 2007/0065132 A1 | 3/2007 | Hagino | |
| 2007/0092141 A1 | 4/2007 | Hagino | |
| 2007/0094190 A1 | 4/2007 | Hagino | |
| 2016/0086578 A1 | 3/2016 | Iwasaki et al. | |
| 2017/0076674 A1* | 3/2017 | Shintani | ............... G09G 3/3406 |

(Continued)

FOREIGN PATENT DOCUMENTS

| | | |
|---|---|---|
| JP | 3799365 B1 | 7/2006 |
| JP | 2016-062324 A1 | 4/2016 |

OTHER PUBLICATIONS

Oct. 2020 European Search Report in European Patent Appln. No. 20179736.2.

*Primary Examiner* — Douglas Q Tran
(74) *Attorney, Agent, or Firm* — Venable LLP

(57) ABSTRACT

A multifunction inkjet printer that displays an image on a display device includes: an operation display unit configured to receive an instruction from a user; and a CPU configured to control the display device to display an image, wherein, in a state where display on the display device is being performed at a first refresh rate, in response to the operation display unit receiving an instruction for displaying a code to be captured by a mobile terminal, the CPU is configured to control the display device to display the code at a second refresh rate that has a higher frequency than the first refresh rate.

15 Claims, 9 Drawing Sheets

(56) References Cited

U.S. PATENT DOCUMENTS

| | | |
|---|---|---|
| 2017/0337899 A1 | 11/2017 | Iwasaki et al. |
| 2020/0105177 A1* | 4/2020 | Choi .................. G09G 3/20 |
| 2020/0145607 A1* | 5/2020 | Zhang ................ G09G 5/003 |
| 2020/0220718 A1* | 7/2020 | Tsuji .................. H04N 1/4413 |

* cited by examiner

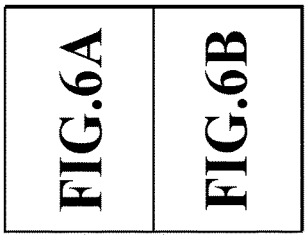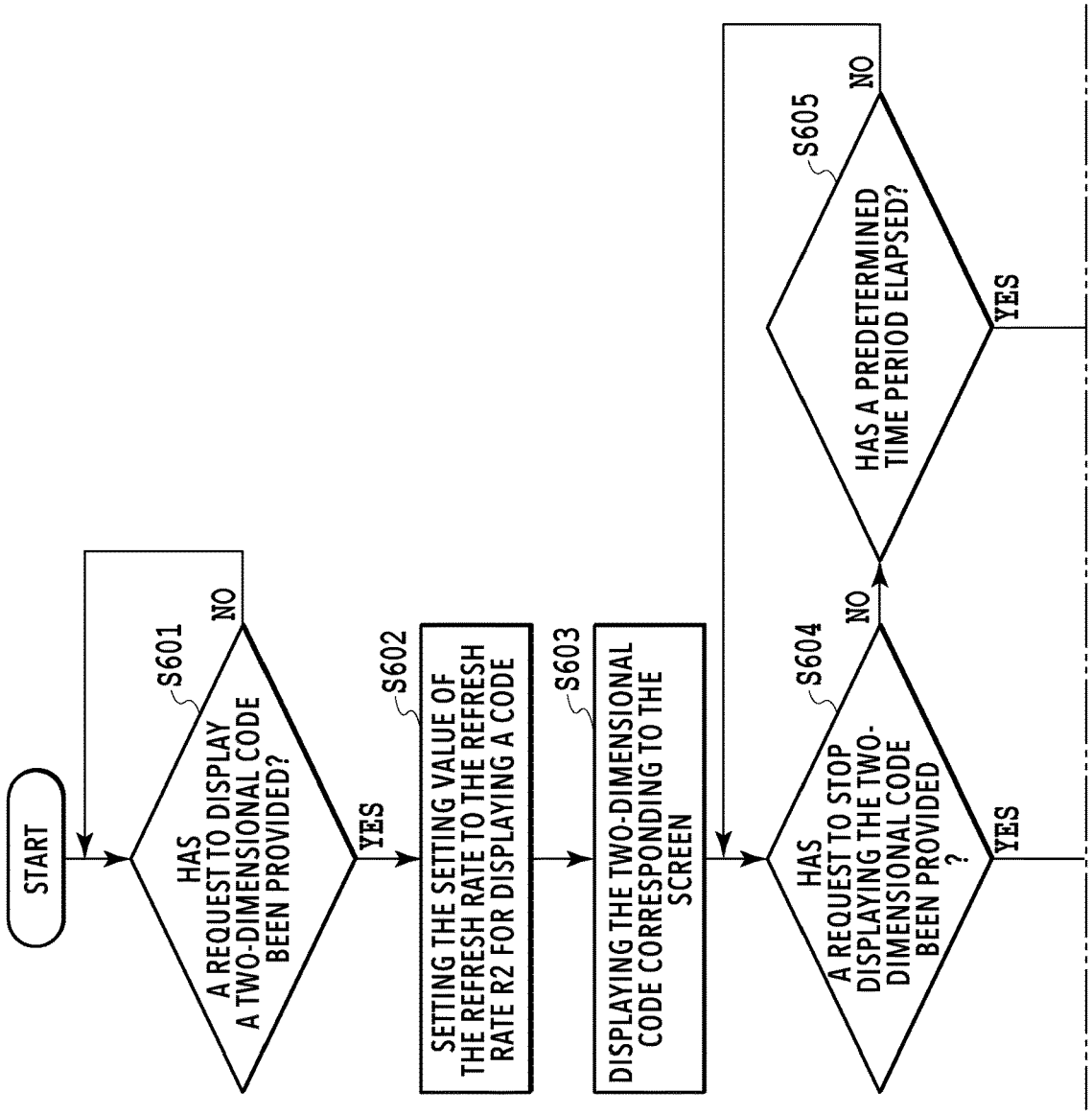

DISPLAY CONTROL APPARATUS, DISPLAY CONTROL METHOD, AND SYSTEM

BACKGROUND OF THE INVENTION

Field of the Invention

The present disclosure relates to display control for displaying a code.

Description of the Related Art

In recent years, a two-dimensional code such as a QR code (registered trademark) is displayed on a display device of an electronic apparatus, so that a user reads the two-dimensional code by use of a camera such as a mobile phone. Japanese Patent Laid-Open No. 2016-62324 discloses a technology of performing normal display with a contrast ratio for normal display and displaying a code with a contrast ratio for displaying a code.

However, there is a case in which interference fringes, which are caused by interference between a screen update timing of the display device of the electronic apparatus and a frame update timing of the camera, emerge on the screen of the camera, and the code cannot be properly read.

SUMMARY OF THE INVENTION

The display control apparatus according to an aspect of the present disclosure is a display control apparatus that displays an image on a display unit, the display control apparatus including: a reception unit configured to receive an instruction from a user; and a control unit configured to control the display unit to display an image, wherein, in a state where display on the display unit is being performed at a first refresh rate, in response to the reception unit receiving an instruction for displaying a code to be captured by a camera, the control unit is configured to control the display unit to display the code at a second refresh rate that has a higher frequency than the first refresh rate.

Further features of the present invention will become apparent from the following description of exemplary embodiments with reference to the attached drawings.

BRIEF DESCRIPTION OF THE DRAWINGS

FIG. 6 is a diagram showing the relationship of FIGS. 6A and 6B;

FIGS. 6A and 6B are totally a diagram illustrating a flowchart;

DESCRIPTION OF THE EMBODIMENTS

Hereinafter, an explanation is given of embodiments according to the present disclosure with reference to the drawings. It is not intended that the embodiments below limit the present disclosure, and all of the combinations of the characteristics explained in the present embodiments are not necessarily essential. The same reference sign is assigned for explanations of the same configuration.

First Embodiment

For the explanation of the present embodiment, a multifunction inkjet printer is taken as the example of an electronic apparatus that displays a two-dimensional code. Furthermore, a mobile terminal, which is represented by a smartphone, a tablet terminal, or the like, is taken as the example of a reader that reads a two-dimensional code for the explanation.

Block Diagram

Figure 1:
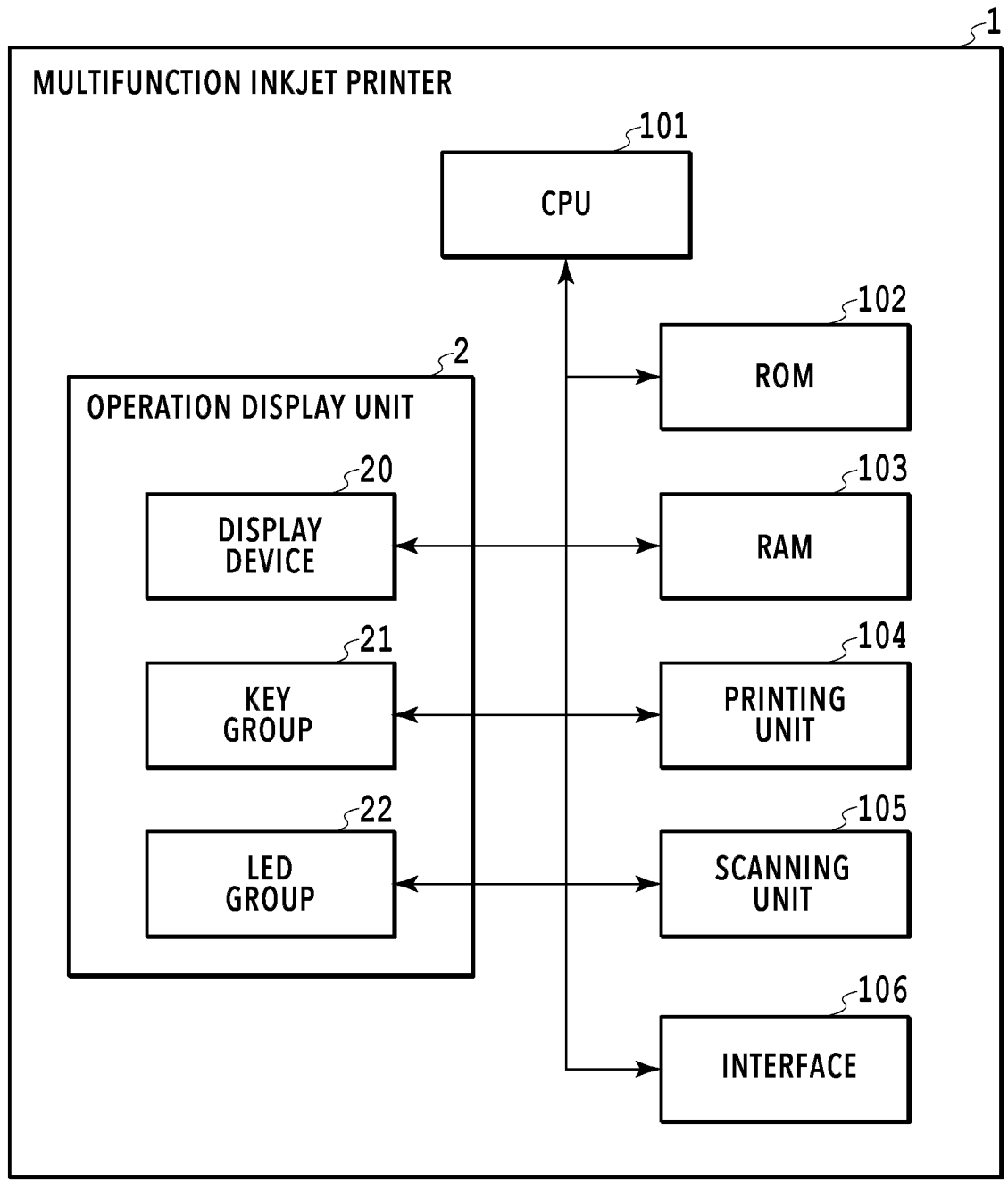
FIG. 1 is a diagram illustrating blocks of a multifunction inkjet printer.

FIG. 1 is a diagram illustrating blocks of the multifunction inkjet printer 1, which is the display control apparatus of the present embodiment. The multifunction inkjet printer 1, which is an inkjet recording apparatus, includes a CPU 101, a ROM 102, a RAM 103, a printing unit 104, a scanning unit 105, an interface 106, and an operation display unit 2.

The CPU 101 entirely controls the multifunction inkjet printer 1 via a system bus. The ROM 102 stores program codes of the main body, initial value data, and various kinds of tables. Furthermore, the ROM 102 temporarily stores various kinds of setting values for the contrast and refresh rate, etc., of the display device 20. The RAM 103 is an image buffer that temporarily saves image data read by the scanning unit 105 and print image data sent via the interface 106.

The printing unit 104 includes a printing engine of an inkjet system, and the printing unit 104 prints an image saved in the RAM 103 on a print sheet. The scanning unit 105 performs photo-electric conversion for converting an optically-read image into electrical image signals by use of a contact image sensor. The interface 106 performs wireless or wired network communication, and the interface 106 is used for transmission and reception of information or a command to and from an external device.

The operation display unit 2 includes a display device 20, a key group 21, and an LED group 22. The display device 20 is capable of displaying a state of the multifunction inkjet printer 1, various kinds of menu screens, information of the main body of the multifunction inkjet printer 1, or the like. The display device 20 of the present embodiment is an organic electro-luminescence (EL) display device in which a passive matrix driving system is employed. The key group 21 is a reception unit (input unit) that receives input of various kinds of instructions, such as copying or printing, from the user. The LED group 22 are indicator lights that indicate a state of the power supply and an error state for the user.

Explanation of the Operation Display Unit

Figure 2:
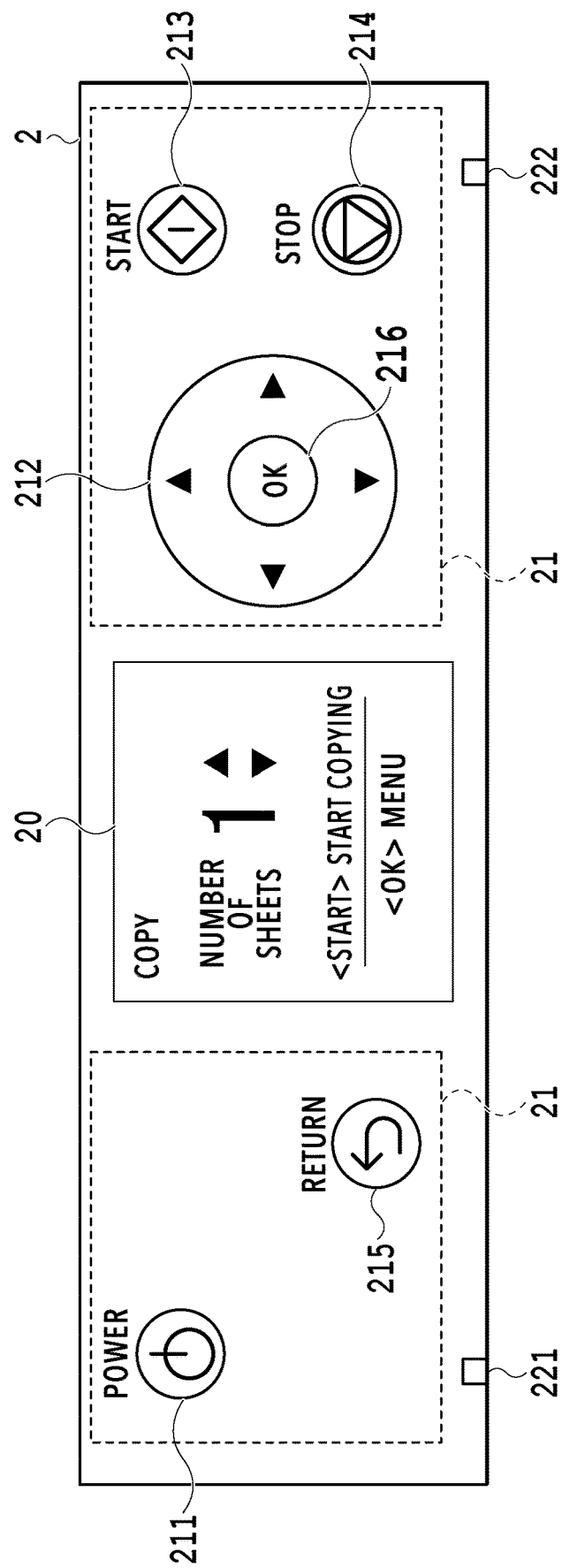
FIG. 2 is a schematic diagram of an operation display unit.

FIG. 2 is a schematic diagram of the operation display unit 2. The display device 20 displays a predetermined image according to display setting values for the contrast and refresh rate, etc., which are stored in the ROM 102. The key group 21 includes a power supply key 211, arrow keys 212, a start key 213, a stop key 214, a return key 215, and an OK key 216. The LED group 22 includes a power LED 221, which indicates the ON state of the power supply, and an error LED 222, which indicates an abnormal condition of the main body.

Figure 3A:
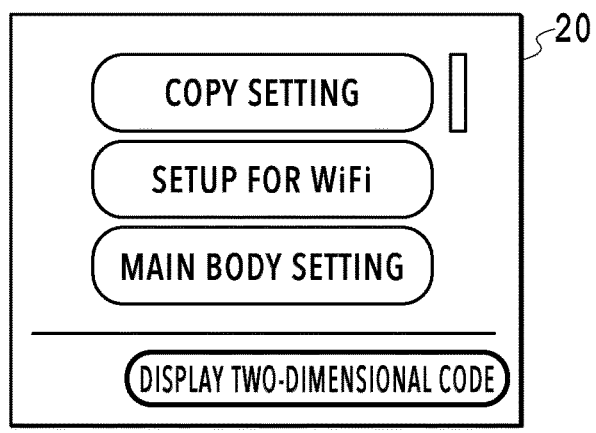
FIGS. 3A through 3C are diagrams for explaining a display screen to be displayed on the operation display unit.
Figure 3B:
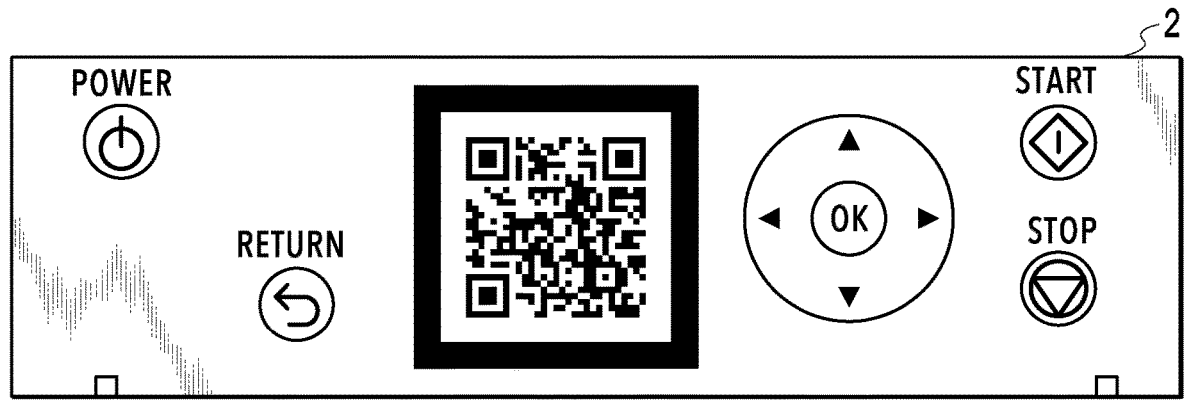
Figure 3C:
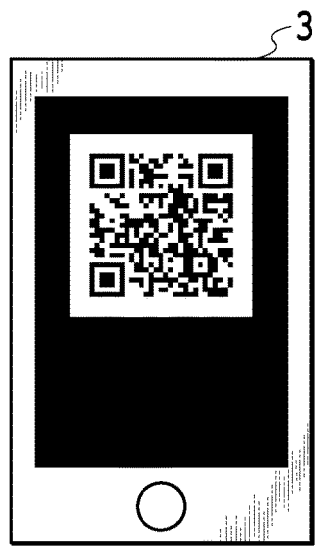

FIGS. 3A through 3C are diagrams for explaining a display screen to be displayed on the operation display unit 2 in the present embodiment. FIG. 3A is a diagram illustrating an example of a menu screen. As illustrated in FIG. 3A, the display size of the display device 20 of the multifunction inkjet printer 1 is small. Therefore, the information amount that the user can check on the display device 20 is less than that of a mobile terminal such as a smartphone. Therefore, in the multifunction inkjet printer 1 of the present embodiment, for example, in a case of presenting the user with contents having a large information amount, such as an operation manual, a two-dimensional code in which a URL for accessing the operation manual on the Web is encoded is displayed on the display device 20. In FIG. 3A, the "DISPLAY TWO-DIMENSIONAL CODE" button is displayed. This is because the menu screen of FIG. 3A is capable of displaying such a corresponding URL. For example, using the arrow keys 212, the user selects the "DISPLAY TWO-DIMENSIONAL CODE" on the menu screen illustrated in FIG. 3A and presses the OK key 216. Then, a two-dimensional code is displayed on the display device 20 as illustrated in FIG. 3B. Instead of such a menu screen as illustrated in FIG. 3A, it is also possible that the "DISPLAY TWO-DIMENSIONAL CODE" button is displayed on another screen such as a settings screen. Additionally, although the "DISPLAY TWO-DIMENSIONAL CODE" button is displayed on the display device 20 in the present example, it is also possible that the operation display unit 2 includes a physical key (not illustrated in the drawings) for inputting the instruction for displaying a two-dimensional code. A URL is merely an example of information included in a two-dimensional code, and various other kinds of information may be included in a two-dimensional code.

FIG. 3B is a diagram illustrating the operation display unit 2 in which a two-dimensional code is displayed on the display device 20 after the "DISPLAY TWO-DIMENSIONAL CODE" is selected on the menu screen illustrated in FIG. 3A. The user reads the two-dimensional code screen of the display device 20 with a mobile terminal 3 such as a smartphone, so that the mobile terminal 3 accesses the URL included in the two-dimensional code. FIG. 3C is an example in which the user is reading the two-dimensional code screen of the display device 20 with the camera of the mobile terminal 3. As a result, the user can refer to detailed explanations on the Web on the mobile terminal 3. Although a form in which the arrow keys 212 and the OK key 216 are used in the present example, in a case where a touch panel display is employed for the display device 20, there may be such a form in which the "DISPLAY TWO-DIMENSIONAL CODE" is selected on the touch panel.

Explanation of Interference Fringes

Figure 4B:
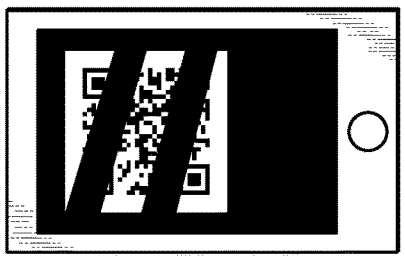
FIGS. 4A through 4D are conceptual diagrams illustrating a frame rate and a refresh rate.
Figure 4D:
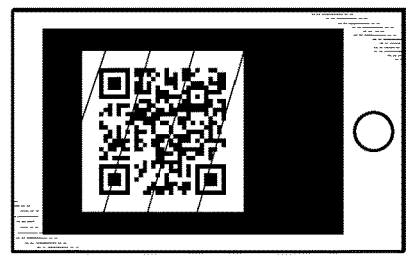
Figure 4A:
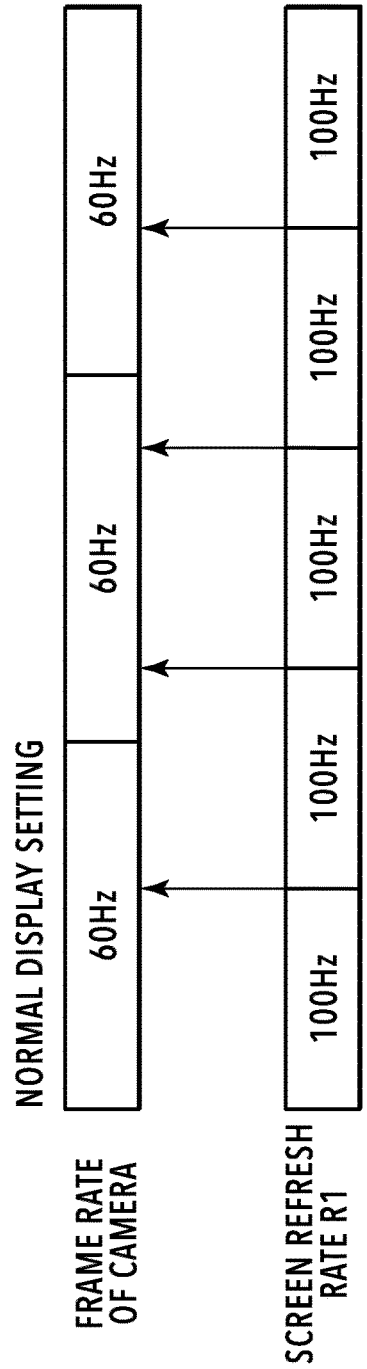

FIGS. 4A through 4D are conceptual diagrams illustrating a frame rate of the camera of the mobile terminal 3 and a refresh rate of the display device 20. In FIGS. 4A and 4B, situations in a normal display setting (hereinafter referred to as a normal mode) are illustrated, and, in FIGS. 4C and 4D, situations in a two-dimensional code display setting (hereinafter referred to as a code display mode) are illustrated. The present embodiment is a form in which the refresh rate of the display device 20 are switched between the normal mode and the code display mode.

In the present embodiment, the refresh rate R1 of the display device 20 in the normal mode is set to 100 Hz, which is a normal setting value. The refresh rate R1 of the normal mode is referred to as the first refresh rate. The frame rate of a camera of a general smartphone is about 30 to 60 Hz. Since the frame rate of the camera of the mobile terminal 3 and the refresh rate of the display device 20 are not synchronized, a screen of the display device 20 in the middle of refreshing is read in one frame of the camera, which is the reader of the mobile terminal 3.

For example, as illustrated in FIG. 4A, in a case where the frame rate of the camera of the mobile terminal 3 is 60 Hz, it is possible that a refresh timing of the display device 20 falls in between frame update timings of the camera only once. In this case, such interference fringes as illustrated in FIG. 4B may emerge in the two-dimensional code that is read by the camera of the mobile terminal 3. Such interference fringes are caused by interference between an update timing of scanning lines of the display device 20 and a read timing at a frame of a camera. Specifically, the display device 20 sequentially repeats turning lights on and off for each scanning line from an upper scanning line to a lower scanning line on the screen. For example, in a case where the refresh rate is 100 Hz, the display device 20 turns lights on and off for each scanning line as described above across the entire screen in $\frac{1}{100}$ seconds. Therefore, in a case where the display device 20 displays a two-dimensional code and a camera captures the two-dimensional code, a more brightly captured portion and a more darkly captured portion will be present in the two-dimensional code included in one frame captured by the camera. For example, in the example of FIG. 4A, a two-dimensional code in which a specific portion is bright and a specific portion is dark will be included in each of the three frames obtained by frame reading performed three times. Since such three frames are repeatedly captured and displayed every three frame readings ($\frac{1}{20}$ seconds), interference fringes emerge in the code captured by the camera.

For example, in such a case where interference fringes emerge as illustrated in FIG. 4B, the two-dimensional code cannot be normally read by the mobile terminal 3. Particularly, an organic EL display device has a faster response speed (response time) for turning each pixel on and off, compared to a liquid crystal display device. That is, the difference between such a more brightly captured portion and a more darkly captured portion of a code as described above becomes more prominent. On the other hand, on a liquid crystal display device whose response speed is slower than that of an organic EL display device, since an image remains as an afterimage on the display device even though a pixel is turned off, it is more unlikely that interference fringes emerge. That is, in a case of an organic EL display device whose response speed is fast, it is more likely that such interference fringes as illustrated in FIG. 4B emerge.

Figure 4C:
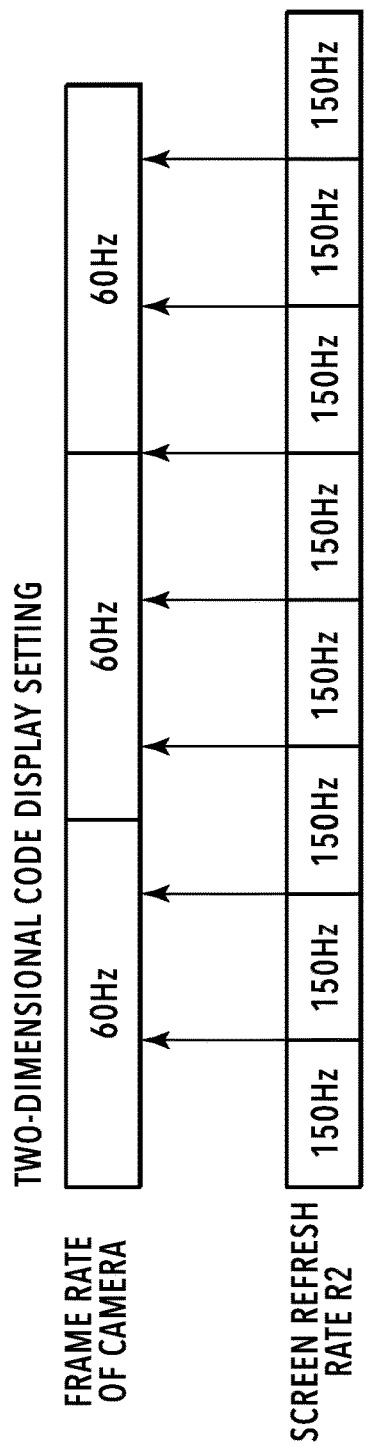

Next, an explanation is given of an example of the code display mode. In the present embodiment, the refresh rate R2 of the display device 20 in the code display mode is set to 150 Hz. The refresh rate R2 of the code display mode is referred to as the second refresh rate. As illustrated in FIG. 4C, in a case where the second refresh rate R2 of the display device 20 is 150 Hz, at least two refresh timings of the display device 20 fall in between frame update timings of the camera. That is, the update speed of the scanning lines of the display device 20 becomes faster, compared to FIG. 4A. That is, compared to the case illustrated in FIG. 4A, lights are turned on (or off) for more scanning lines of the display device 20 and a larger number of times during a period in which the camera captures one frame. Therefore, in the two-dimensional code included in the one frame, the amount of portions that are more darkly captured than the other portions is reduced, and, as a result, there will be less interference fringes.

Therefore, in a case where the display device 20 performs display at the refresh rate illustrated in FIG. 4C, interference fringes caused by interference between an update timing of scanning lines of the display device 20 and a read timing at a frame of the camera will be as illustrated in FIG. 4D, for example. As for the interference fringes illustrated in FIG. 4D, the degree of interference is reduced, compared to FIG. 4B. In a case where interference fringes are as illustrated in FIG. 4D, the two-dimensional code can be read by the camera of the mobile terminal 3. As for the display device 20 of the present embodiment, it is assumed that 150 Hz, which corresponds to the second refresh rate R2, is a value that does not affect the driving of the display device 20. Such values of the first refresh rate R1 and the second refresh rate R2 are stored in the ROM 102 in advance.

The second refresh rate R2 of the code display mode may be a value that can be designated by the user or a value that cannot be designated by the user. By a value that cannot be designated by the user, it means that the second refresh rate R2 is not included in options provided for the user to arbitrarily set the refresh rate of the display device 20, for example. The second refresh rate R2 of the present embodiment has a frequency that is more than twice higher than the frame rate of the camera of the mobile terminal 3.

As described above, in the present embodiment, the second refresh rate R2 (150 Hz) of the code display mode is set to have a higher rate than the first refresh rate R1 (100 Hz) of the normal mode. These numerical values are merely examples. The second refresh rate R2 may be any value as long as the second refresh rate R2 has a higher rate than the first refresh rate R1 of the normal mode, and given numerical values may be adopted. By displaying a two-dimensional code in the code display mode, it is possible to prevent interference fringes from emerging in a case of reading the two-dimensional code with the camera of the mobile terminal 3, so that the two-dimensional code can be properly read by the mobile terminal 3. Although the power consumption for the second refresh rate R2 of the code display mode is higher than the first refresh rate R1 of the normal mode, it is possible to suppress the effect in terms of the entire power consumption by using the second refresh rate R2 only in a case of displaying a code.

It is also possible to set the refresh rate lower than the first refresh rate R1 of the normal mode, so that the refresh rate becomes lower than the frame rate of the camera. Even in this case, such an effect of interference fringes as described above is reduced. However, in this case, the lights of all scanning lines of the display device 20 are not turned on during the image-capturing period of one frame of the camera. Therefore, it is possible that the entire code is not captured in one captured frame. Therefore, for example, in a case where the mobile terminal 3 that reads the code is configured to analyze a code included in one frame, the mobile terminal 3 may not be able to properly read information from the code. Furthermore, in a case where the refresh rate is low, the frequency of switching scanning lines whose lights are turned on on the display device 20 per unit time becomes low. Therefore, it may be possible that the switching can be recognized by the user.

As illustrated in FIGS. 4A through 4D, in a case where the first refresh rate R1 of the normal mode and the second refresh rate R2 of the code display mode are both higher than the frame rate of the camera, the effect of interference fringes can be suppressed. Furthermore, it is possible to make it easy to read information from a two-dimensional code included in one frame.

Flowchart

Figure 5:
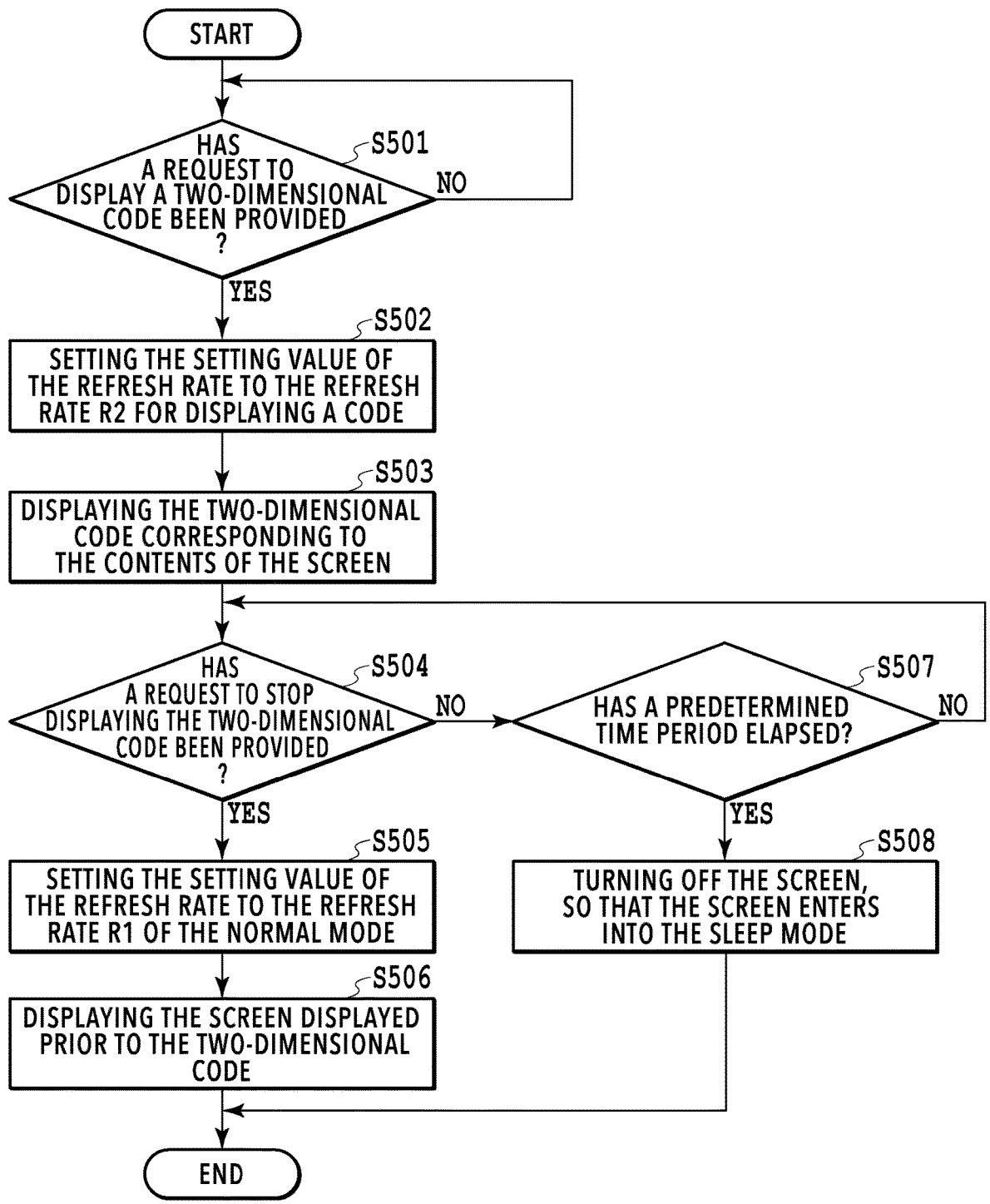
FIG. 5 is a diagram illustrating a flowchart.

FIG. 5 is a diagram illustrating a flowchart in the present embodiment. The flowchart illustrated in FIG. 5 is processing to be executed after the power supply of the multifunction inkjet printer 1 is turned on. The series of processes illustrated in the flowchart of FIG. 5 is performed by the CPU 101 retrieving a program code stored in the ROM 102 into the RAM 103 and executing the program code. Alternatively, a part or all of the functions in the steps of FIG. 5 may be implemented by hardware such as an ASIC or an electronic circuit. The symbol "S" in the explanation of each process means that it is a step of the flowchart.

In S501, the CPU 101 determines whether a request to display a two-dimensional code has been provided, and the CPU 101 stands by until a request to display a two-dimensional code is provided. Whether a request to display a two-dimensional code has been provided is determined by determining whether or not the "DISPLAY TWO-DIMENSIONAL CODE" button has been selected by the user by operating the key group 21 as illustrated in FIG. 3A, for example. At the timing of S501, that is, in a case where such a menu screen as illustrated in FIG. 3A is displayed on the display device 20, the display on the display device 20 is being performed in the normal mode. That is, the display is performed at the first refresh rate R1.

In the explanation of the present embodiment, the CPU 101 determines that an instruction of a request to display a two-dimensional code has been provided in a case where the "DISPLAY TWO-DIMENSIONAL CODE" button has been selected by use of the arrow keys 212 and the OK key 216 has been pressed. However, the present embodiment is not limited as such. It is also possible that the CPU 101 determines whether the image to be displayed on the display device 20 is a two-dimensional code, so as to determine that a request to display a two-dimensional code has been provided in a case where a two-dimensional code is to be displayed. That is, the operation to the "DISPLAY TWO-DIMENSIONAL CODE" button may or may not be a trigger. In a case where a request to display a two-dimensional code has been provided, the processing proceeds to S502.

In S502, the CPU 101 switches the refresh rate of the display device 20 from the first refresh rate R1 of the normal mode to the second refresh rate R2 for displaying a code. That is, the CPU 101 sets the refresh rate of the display device 20 to the second refresh rate R2 for displaying a code. Then, in S503, the CPU 101 displays the image of the two-dimensional code, which corresponds to the contents of the currently-displayed screen (image), on the display device 20. It is possible for the user to read the image of the two-dimensional code with the camera of the mobile terminal 3 and refer to such a manual page of a website, etc., on the mobile terminal 3.

In S504, the CPU 101 determines whether a request to stop displaying the two-dimensional code has been provided. For example, it is possible for the user to stop displaying the two-dimensional code by pressing the return key 215 or the OK key 216. Therefore, the CPU 101 determines whether the return key 215 or the OK key 216 has been pressed. In a case where a request to stop displaying the two-dimensional code has been provided, the processing proceeds to S505. In a case where the request has not been provided, the processing proceeds to S507. In a case where a screen relating to printing is to be displayed on the display device 20 in response to reception of a print job from an external host (not illustrated in the drawings), it is also possible to assume that a request to stop displaying the two-dimensional code has been provided.

In a case where a request to stop displaying the two-dimensional code has been provided, the CPU 101 sets the setting value of the refresh rate of the display device 20 to the first refresh rate R1 of the normal mode in S505. Then, in S506, the CPU 101 displays the screen displayed prior to the two-dimensional code on the display device 20, and the CPU 101 ends the series of processes.

On the other hand, in a case where a request to stop displaying the two-dimensional code has not been provided, the CPU 101 determines in S507 whether a predetermined time period (for example, 20 seconds) has elapsed. In a case where the predetermined time period has elapsed, the processing proceeds to S508. In S508, the CPU 101 turns off the screen of the display device 20, so that the screen enters into the sleep mode, and the CPU 101 ends the series of processes. In a case where the key group 21 is pressed and the screen returns from the sleep mode, the CPU 101 may display the previously-displayed screen on the display device 20 or may display the menu screen on the display device 20. In such a form in which the previously-displayed screen is to be displayed, the CPU 101 continues displaying the screen of the two-dimensional code at the second refresh rate R2 for displaying a code in the case where the screen returns from the sleep mode after entering into the sleep mode in S508. In such a form in which the menu screen is to be displayed in the case where the screen returns from the sleep mode, the CPU 101 displays the menu screen on the display device 20 at the first refresh rate R1 of the normal mode in the case where the screen returns from the sleep mode after entering into the sleep mode in S508.

As explained above, according to the present embodiment, the refresh rate of the display device 20 is set to be higher than a normal refresh rate in a case where a two-dimensional code is displayed on the display device 20. In this way, it is possible to suppress the effect of interference fringes in a case where a two-dimensional code is read by the camera of the mobile terminal 3, which is used as a reader. Furthermore, since the refresh rate is temporarily switched for displaying a two-dimensional code, it is possible to suppress an increase in power consumption, compared to, for example, such a case in which the refresh rate is always set to the refresh rate R2.

Second Embodiment

In the first embodiment, the form in which one refresh rate is prepared for displaying a code is taken as an example for the explanation. In the present embodiment, an explanation is given of the form in which multiple refresh rates are prepared for displaying a code, and the refresh rates for displaying a code are switched as needed. For example, in addition to the second refresh rate for displaying a code, which is explained in the first embodiment, a third refresh rate for displaying a code is prepared. In a case where it is assumed that a two-dimensional code has not been read at the second refresh rate, the two-dimensional code is displayed at the third refresh rate, which is different from the second refresh rate. That is, in a case where it is assumed that reading of the two-dimensional code is difficult even at the second refresh rate due to the frame rate of the camera, or the like, the two-dimensional code is displayed at a higher refresh rate, that is, the third refresh rate, so as to make it more unlikely that interference fringes emerge. In this way, it is possible to improve the readability for the mobile terminal 3.

The second refresh rate R2 and the third refresh rate R3 for displaying a code of the present embodiment may both be rates at which at least two refresh timings of the display device 20 fall in between frame update timings of a camera. For example, it is preset that R2 is 150 Hz and R3 is 170 Hz. The second refresh rate R2 and the third refresh rate R3 for displaying a code are both such values that can suppress interference fringes with power consumption and drive control in acceptable ranges.

Figure 6B:
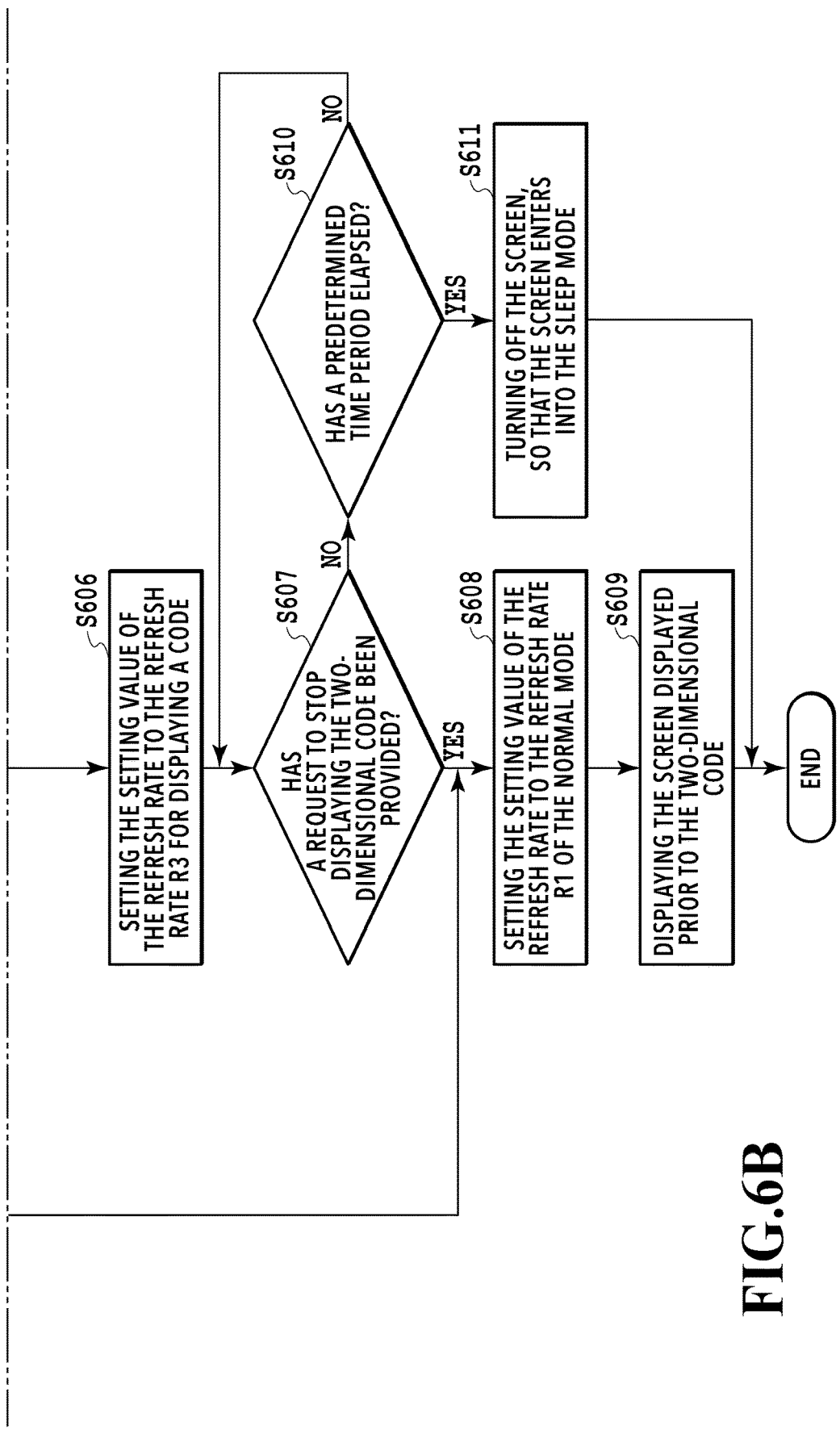

FIGS. 6A and 6B are totally a diagram illustrating a flowchart of the present embodiment. Since S601 to S604 are the same as S501 to S504 of FIG. 5, explanations thereof are omitted. The second refresh rate R2 for displaying a code, which is set in S602 in the present example, is the same value as the second refresh rate R2 explained in the first embodiment as described above.

In S604, the CPU 101 determines whether a request to stop displaying the two-dimensional code has been provided. In a case where a request to stop displaying the two-dimensional code has been provided, the processing proceeds to S608. In a case where the request has not been provided, the processing proceeds to S605. In S605, the CPU 101 determines whether a predetermined time period has elapsed. The processes of S604 and S605 are repeated until the predetermined time period has elapsed.

In a case where a request to stop displaying the two-dimensional code has not been provided in S604 and the predetermined time period has elapsed in S605, the processing proceeds to S606. In S606, the CPU 101 switches the setting value of the refresh rate of the display device 20, on which the two-dimensional code is being displayed, to the third refresh rate R3 for displaying a code. Since it is assumed that the reading by the user is not normally performed, the CPU 101 switches to the third refresh rate R3, which has a higher rate than the second refresh rate R2. The subsequent processes of S607 to S609 and S610 to S611 are the same as the processes of S504 to S506 and S507 to S508 of FIG. 5, the explanations thereof are omitted.

As explained above, according to the present embodiment, in a case where it is assumed that reading is not normally performed even at a refresh rate for displaying a code, the refresh rate is temporarily switched for displaying the two-dimensional code. In this way, it is possible to improve the readability of the two-dimensional code. Furthermore, since the refresh rate is temporarily switched for displaying the two-dimensional code, it is possible to suppress the effect of increase in the power consumption.

Third Embodiment

The present embodiment is a form in which multiple refresh rates for display a code are prepared as in the second embodiment. In the present embodiment, an explanation is given of the example in which the refresh rate for displaying a code is determined according to the information amount of the two-dimensional code to be displayed. In the present embodiment, as in the second embodiment, it is assumed that the second refresh rate R2 for displaying a code is 150 Hz and the third refresh rate R3 for displaying a code is 170 Hz. The third refresh rate R3 may be referred to as the fourth refresh rate, so as to be distinguishable from the second embodiment.

Figure 7A:
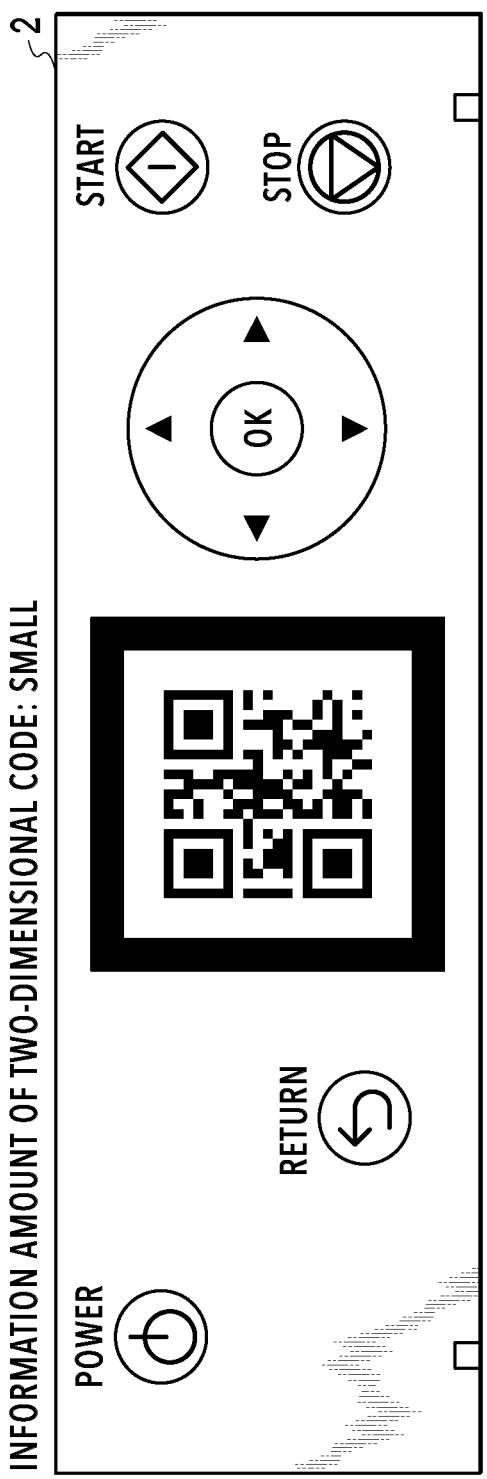
FIGS. 7A and 7B are diagrams for explaining the information amount of a two-dimensional code.
Figure 7B:
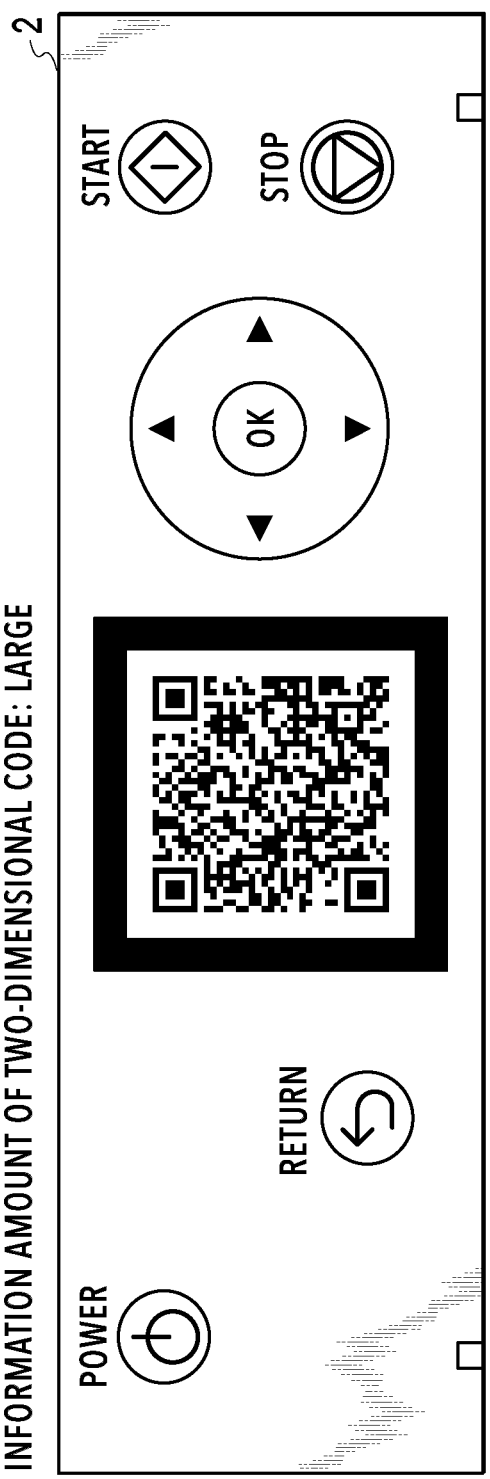

FIGS. 7A and 7B are diagrams for explaining the information amounts of two-dimensional codes. FIG. 7A is an example in which a two-dimensional code whose information amount is equal to or smaller than a predetermined value is displayed on the display device 20. FIG. 7B is an example in which a two-dimensional code whose information amount is larger than the predetermined value is displayed on the display device 20. For such a screen displaying a two-dimensional code whose information amount is equal to or smaller than the predetermined value as illustrated in FIG. 7A, the second refresh rate R2 is set. Meanwhile, on such a screen displaying a two-dimensional code whose information amount is larger than the predetermined value as illustrated in FIG. 7b, it is likely that the effect of interference fringes emerges. Therefore, in the case of FIG. 7B, the third refresh rate R3 is set.

The "information amount of a two-dimensional code" does not have to be the amount of data that is actually encoded (for example, the number of characters in the data indicating a URL) and may be the amount of data that can be encoded. For example, as for a QR code (registered trademark), the version is defined by the number of cells in the code. Furthermore, the maximum information amount, which corresponds to the data amount, character type, and error correction level, is determined according to the version. In the present embodiment, as the "information amount of a two-dimensional code", the amount of actually encoded data (for example, the number of characters in a URL) may be used, or the version of a two-dimensional code (the number of cells in a code) may be used.

Figure 8:
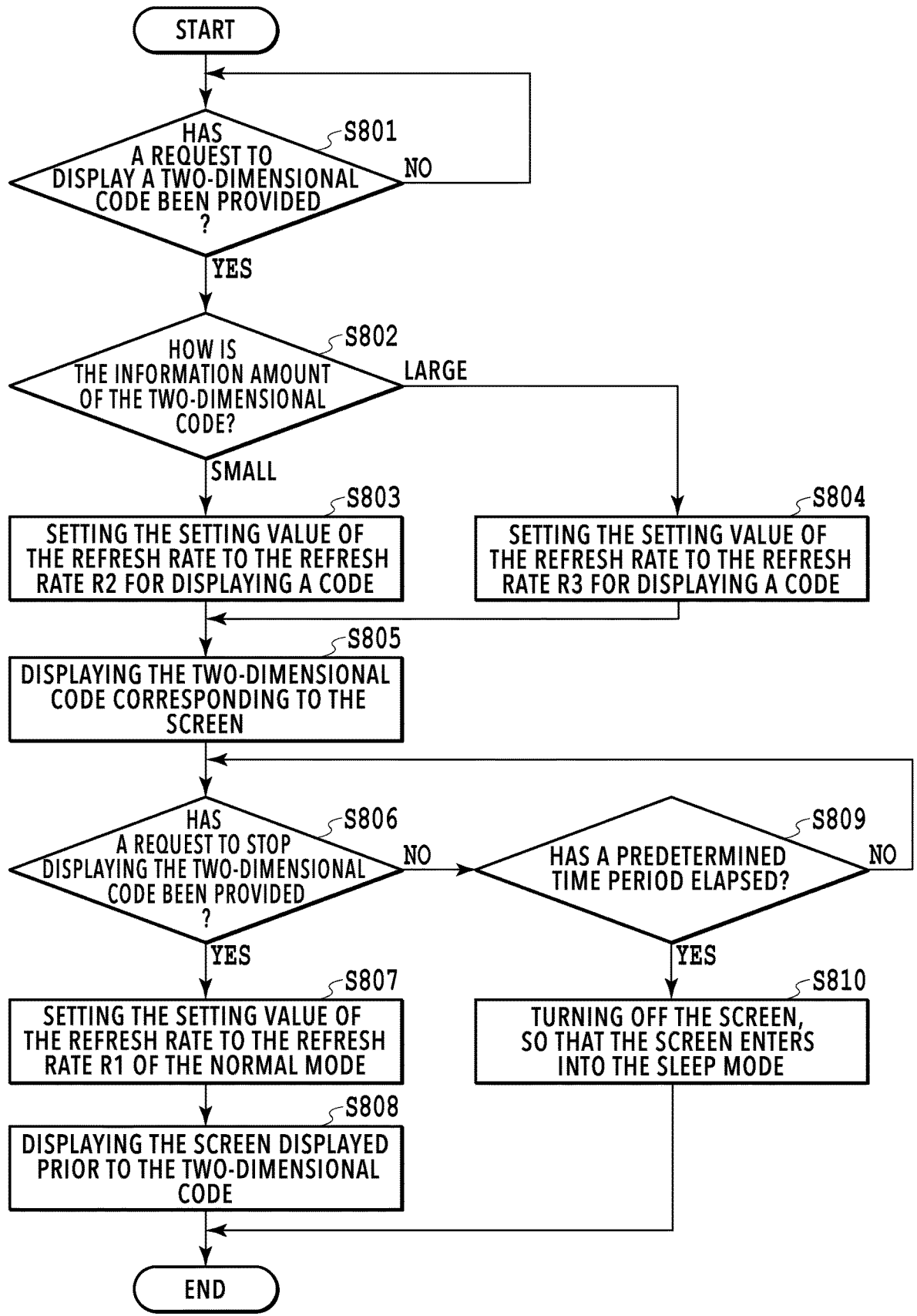
FIG. 8 is a diagram illustrating a flowchart.

FIG. 8 is a diagram illustrating a flowchart of the present embodiment. In a case where a request to display a two-dimensional code has been provided in S801, the CPU 101 determines in S802 whether the information amount of the two-dimensional code to be displayed is larger than a predetermined value. In a case where the information amount of the two-dimensional code is not larger than the predetermined value, the processing proceeds to S803, so that the CPU 101 switches the refresh rate of the display device 20 from the first refresh rate R1 of the normal mode to the second refresh rate R2 for displaying a code. On the other hand, in a case where the information amount of the two-dimensional code is larger than the predetermined value, the effect of interference fringes for reading the two-dimensional code becomes greater. Therefore, in this case, the processing proceeds to S804, so that the CPU 101 switches the refresh rate of the display device 20 from the first refresh rate R1 of the normal mode to the third refresh rate R3 for displaying a code. Since the subsequent processes of S805 to S810 are the same as the processes of S503 to S508 of FIG. 5, the explanations thereof are omitted.

As explained above, according to the present embodiment, it is possible to reduce the effect of interference fringes and suppress the effect of increase in the power consumption by switching the refresh rate of the display device 20 for displaying a code, according to the information amount of a two-dimensional code.

OTHER EMBODIMENTS

In the explanations of the above-described embodiments, an organic EL display device in which a passive matrix system is employed is taken as an example of the display device 20. However, it is also possible to use an organic EL display device in which an active matrix system is employed. Furthermore, although it is more likely that interference fringes emerge on an organic EL display device because of a high response speed thereof, there may be such a form in which the refresh rate is switched in an electronic apparatus in which a liquid crystal display device is employed as the display device.

Moreover, although the multifunction inkjet printer 1 is taken as an example of a display control apparatus in the explanations of the above-described embodiments, the present embodiments are not limited as such. There may be such a form in which the refresh rate is switched in a given electronic apparatus that displays a two-dimensional code. Additionally, although the form of reading a two-dimensional code has been explained, there may be a form of reading a code displayed on the display device 20.

Moreover, although the example in which the refresh rate of the display device 20 for displaying a code is switched according to the information amount of a two-dimensional code has been explained in the third embodiment, there may be a form combined with the second embodiment. That is, in a case where a time period in which a code is displayed at a refresh rate determined according to the information amount of a two-dimensional code has elapsed a predetermined time period, the code may be displayed at another refresh rate.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-121681, filed Jun. 28, 2019, which is hereby incorporated by reference herein in its entirety.

What is claimed is:

1. A display control apparatus that displays an image on a display unit, the display control apparatus comprising:
at least one processor causing the display control apparatus to act as a plurality of units comprising:

(1) a reception unit configured to receive an instruction based on a user input; and
(2) a control unit configured to control the display unit to display an image,
wherein the control unit causes the display unit to display, at a first refresh rate, a screen in which is not included a code to be captured by a camera provided on a terminal apparatus, and
wherein the control unit causes the display unit to display, at a second refresh rate that has a higher frequency than the first refresh rate, a screen in which the code is included so that the terminal apparatus is able to access information obtained by reading the code.

2. The display control apparatus according to claim 1, wherein, in response to an instruction received by the reception unit while the code is being displayed on the display unit, the control unit is configured to control the display unit to display, at the first refresh rate, an image displayed prior to the code.

3. The display control apparatus according to claim 1, wherein, in a case where the reception unit does not receive an instruction during a predetermined time period from a timing where the code is displayed on the display unit, the control unit is configured to control the display unit to enter into a sleep mode.

4. The display control apparatus according to claim 1, wherein, in a case where a predetermined time period in which the code is displayed on the display unit at the second refresh rate has elapsed, the control unit is configured to control the display unit to display the code at a third refresh rate that has a higher frequency than the second refresh rate.

5. The display control apparatus according to claim 4, wherein, in a case where the reception unit does not receive an instruction during a predetermined time period from a timing where the code is displayed on the display unit at the third refresh rate, the control unit is configured to control the display unit to enter into a sleep mode.

6. The display control apparatus according to claim 3, wherein, if the code is to be displayed on the display unit in a case where the display unit returns from the sleep mode, the control unit is configured to control the display unit to display the code at a refresh rate used at a timing where the display unit enters into the sleep mode, and
wherein, if the code is not to be displayed on the display unit in a case where the display unit returns from the sleep mode, the control unit is configured to control the display unit to display an image at the first refresh rate.

7. The display control apparatus according to claim 1, wherein, in a case where an information amount of the code to be displayed is equal to or smaller than a predetermined value, the control unit is configured to control the display unit to display the code at the second refresh rate, and
wherein, in a case where the information amount of the code to be displayed is larger than the predetermined value, the control unit is configured to control the display unit to display the code at a fourth refresh rate that has a higher frequency than the second refresh rate.

8. The display control apparatus according to claim 1, wherein the code corresponds to a two-dimensional code.

9. The display control apparatus according to claim 1, wherein the second refresh rate has a higher frequency than a frame rate of the camera that reads the code.

10. The display control apparatus according to claim 9, wherein the second refresh rate corresponds to a frequency that is more than twice the frame rate of the camera that reads the code.

11. The display control apparatus according to claim 9, wherein the first refresh rate and the second refresh rate have frequencies that are higher than the frame rate of the camera that reads the code.

12. The display control apparatus according to claim 1, wherein the display unit corresponds to an organic electroluminescence (EL) display device in which a passive matrix driving system is employed.

13. The display control apparatus according to claim 1, further comprising:
the display unit; and
a printing unit configured to print an image on a print sheet.

14. A display control method for displaying an image on a display unit, the display control method comprising:
receiving an instruction based on a user input; and
controlling the display unit to display an image,
wherein the display unit is controlled to display, at a first refresh rate, a screen in which is not included a code to be captured by a camera provided on a terminal apparatus, and
wherein the display unit is controlled to display, at a second refresh rate that has a higher frequency than the first refresh rate, a screen in which the code is included so that the terminal apparatus is able to access information obtained by reading the code.

15. A system including (a) a display control apparatus that displays an image on a display unit and (b) a camera that captures an image at a predetermined frame rate, the display control apparatus comprising:
at least one processor causing the display control apparatus to act as a plurality of units comprising:
(1) a reception unit configured to receive an instruction based on a user input; and
(2) a control unit configured to control the display unit to display an image,
wherein the control unit causes the display unit to display, at a first refresh rate, a screen in which is not included a code to be captured by the camera, the camera being provided on a terminal apparatus, and
wherein the control unit causes the display unit to display, at a second refresh rate that has a higher frequency than the first refresh rate, a screen in which the code is included so that the terminal apparatus is able to access information obtained by reading the code.

* * * * *